Dec. 3, 1963   J. M. BRINKERHOFF ETAL   3,113,213
APPARATUS FOR PRODUCING NEUTRONS
Original Filed July 20, 1953   4 Sheets-Sheet 1

INVENTORS
JORIS M. BRINKERHOFF
WILLARD C. HADLEY
VICTOR E. RAGOSINE
JAMES W. SHEARER

ATTORNEY

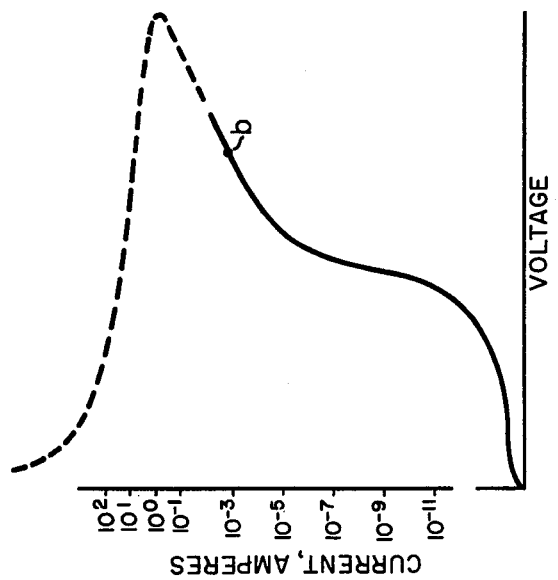
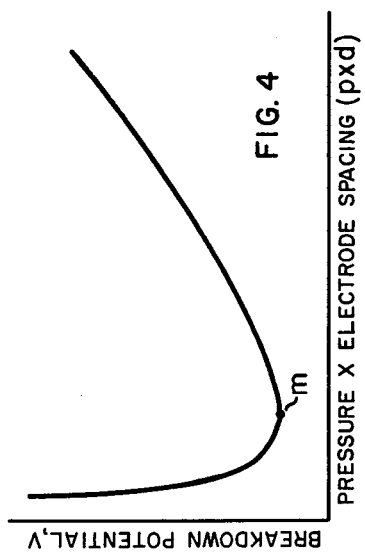
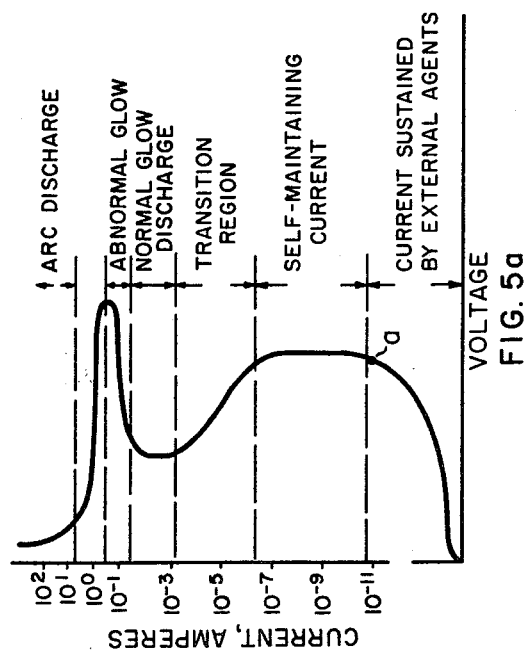

INVENTORS
JORIS M BRINKERHOFF
WILLARD C HADLEY
VICTOR E RAGOSINE
JAMES W SHEARER
BY
ATTORNEY 3,113,213
APPARATUS FOR PRODUCING NEUTRONS
Joris M. Brinkerhoff, Arlington, and Willard C. Hadley, Newburyport, Mass., Victor E. Ragosine, Sandy Hook, Newtown, Conn., and James W. Shearer, Livermore, Calif., assignors, by mesne assignments, to Laboratory For Electronics, Inc., Boston, Mass., a corporation of Delaware
Original application July 20, 1953, Ser. No. 368,898, now Patent No. 2,926,271, dated Feb. 23, 1960. Divided and this application Dec. 1, 1959, Ser. No. 856,558
7 Claims. (Cl. 250—84.5)

This application is a division of our pending application Serial No. 368,898, filed July 20, 1953, entitled Apparatus for Producing Neutrons, now U.S. Patent No. 2,926,271.

This invention relates generally to the field of nuclear physics and more particularly to an improved method and apparatus for the production of neutrons.

Thermal neutron fluxes of sufficient intensity may be used to produce radioactive isotopes of naturally non-radioactive elements. Such isotopes are being increasingly used as tracers in medical, industrial and academic research, in the control of industrial processes and in medical therapy. In addition, a measurement of the activity produced by thermal neutrons in a given material is an extremely powerful non-destructive analytical tool for research and process control. Fast and thermal neutron fluxes of known intensity have a more limited application in instrument calibration and experimentation designed to establish safe tolerance levels of neutron dosage. The latter application is assuming greater importance with the progress being made in reactors to be used for propulsion and the generation of power.

Thermal neutrons are not produced directly as a result of nuclear reactions, the energy relationships in any reaction being such that the energies of any resultant neutrons are usually measured in million electron volts (mev.) instead of tenths and hundredths of an electron volt. Fast neutrons, however, may be thermalized by scattering in an appropriate medium, water, paraffin, and plastics such as polyethylene and polystyrene, having low absorption cross sections and high scattering cross sections, being efficient thermalizers. A thermal neutron flux may therefore be produced by surrounding a fast neutron source with an appropriate thermalizer.

Long lived isotopes of high specific activity can only be produced in the intense fluxes available in a pile and are not under consideration here. For the other applications which have been mentioned the only neutron sources heretofore available with which applicants are familiar have been radium-beryllium, polonium-beryllium and antimony-beryllium sources; Van de Graaf generators which produce neutrons by the bombardment of a target; cyclotrons which produce neutrons in a similar fashion; and kevatrons which produce neutrons by bombarding a target with appropriate ions of lower energy than those used in Van de Graaf generators or cyclotrons.

Radium-beryllium sources are prohibitively high in cost to permit their use for the production of fluxes suitable for the above-mentioned applications which are necessarily of the order of $10^9$ neutrons/sec.

Cyclotrons and mega-volt Van de Graaf generators are costly, permanent installations, often requiring separate buildings and the services of a large operating staff. Smaller Van de Graaf generators and kevatrons are less costly but require considerable space, permanent installation and operation by highly trained physicists and technicians. All of these devices include ion sources equipped with separate power supplies, means for drawing the ions into an accelerating space, means for producing an accelerating field and a target. Differential pumping or some other means is used to maintain a pressure differential between the ion source and the accelerating space, and means are provided to focus electrostatically or magnetically the ion beam on the target. Thus, in addition to the complexities of construction and operation of devices of this type, total power consumption is high.

The foregoing disadvantages of these devices are outweighed in academic research by the many quantitative measurements which may be made and by the degree of control which can be exercised over the various parameters. However, for the applications previously mentioned, quantitative data are unimportant, the general requirements being a neutron source which is inexpensive, portable, simple in design, easy to operate and which delivers a sufficient neutron flux with unobjectionable radiation hazard due to gamma rays.

It will therefore be seen that a broad object of the present invention is to provide means for producing neutrons.

Another object of the invention is to provide a source of neutrons which is inexpensive, of simple design, and easy to operate.

Another object of the invention is to provide a portable apparatus for producing neutrons.

Still another object of the invention is to provide an apparatus for producing neutrons with little radiation hazard due to gamma rays.

A further object of the invention is to provide a neutron source having the foregoing characteristics which is capable of delivering a sufficient neutron flux for the useful activation of short lived radioisotopes.

Another object of the invention is to provide an apparatus wherein the usual steps of neutron production, namely ion formation, ion acceleration and target bombardment, are accomplished in a common volume.

Another object of the invention is to provide a neutron source wherein the target is gaseous in form.

Another object of the invention is to provide a neutron source wherein ions are produced and accelerated in a common gas-filled volume, the gas further serving as the target material for the accelerated ions.

Other objects and advantages will become apparent from the following discussion and detailed description of illustrative embodiments of the invention.

The production of neutrons is accomplished, in general, by raising atomic nuclei to a state of such high energy ("compound nucleus") that neutrons can be emitted before these nuclei reach a ground state. Any nuclear reaction such as fission, gamma excitation, or charged particle bombardment, can be used provided sufficient excitation energy is available.

Several different types of artificial neutron sources are now known and used. The chain-reacting pile depends on the fission reaction; the radium-beryllium and polonium-beryllium neutron sources depend on the $(\alpha, n)$ reaction on beryllium. The antimony-beryllium source depends on a $(\gamma, n)$ reaction on beryllium, using the gamma rays of Sb-124. "Low energy" charged particle accelerating machine, such as Van de Graaf machines, Cockcroft-Walton devices, linear accelerators, cyclotrons, betatrons, etc., can produce neutrons from a multitude of $(d, n)$, $(d, 2n)$, $(p, n)$, $(\alpha, n)$, etc., reactions on almost any target material. "High energy" charged particle accelerators, such as the "Cosmotron" at Brookhaven National Laboratory, or the "Bevatron" at the University of California Radiation Laboratory can produce neutrons in even more complicated reactions.

Neutrons are produced in nature in cosmic radiation, by charge particle reactions like those just described. It is also believed that neutrons are produced in the interior of stars, as one by-product of the stellar energy-producing reactions.

In recent years, interest in the stellar reactions on the part of astrophysicists, has led to considerable research on the light element charged particle reactions. These reactions are particularly favorable for the production of neutrons due to the high transmission factor of the coulomb barrier. If the cross section for a given reaction is denoted by $\sigma$, it can be stated:

$$\sigma \text{ is proportional to } T.N_n \qquad (1)$$

where T is the "transmission factor" for the bombarding particle to penetrate the nuclear barrier and $N_n$ is the probability that the reaction takes place once the barrier is penetrated. FIG. 1 of the attached drawings is a curve of the potential energy V of the bombarding particle of energy E as a function of the distance $r$ from the center of the bombarded nucleus, where $E_0$ is the energy associated with the discontinuity point in the coulomb barrier. The transmission factor T when $E \leq E_0$ is given by quantum mechanics as:

$$T = \exp\left[-\frac{2Ze^2}{\hbar v}(2w - \sin W)\right] \qquad (2)$$

where W is given by the expression, $\cos^2 W = r_0/r_1$, $r_0$ is the nuclear radius, $r_1$ is the distance from the center of the nucleus associated with the energy E, Z is the atomic number of the bombarded nucleus, $\hbar$ is Planck's constant $h$ divided by $2\pi$, $e$ is the electronic charge, $v$ is the velocity of the bombarding particle, and where the bombarding particle is assumed to have atomic number $Z=1$, and the bombarded nucleus is stationary. The factor $N_n$ is not usually calculable, and must be measured for each reaction by measuring $\sigma$. It can be seen from Equation 2 that T decreases as Z increases. Thus, as stated above, if $N_n$ is not a strong function of Z and/or E, the light element reactions should be more probable at low bombarding energies E.

The principal requirements of a suitable neutron-producing light-element reaction at low bombarding energy E can now be stated as follows: (a) the reaction should be exothermic; and (b) the charges on both reacting nuclei should be as low as possible.

In the light of these conditions, the three suitable reactions among the hydrogen isotopes, namely, deuterium (D) and tritium (T), will now be considered:

$$D+D \rightarrow He^3 + n + 3.3 \text{ mev.}$$
$$T+D \rightarrow He^4 + n + 17.5 \text{ mev.} \qquad (3)$$
$$T+T \rightarrow He^4 + 2n + 11.3 \text{ mev.}$$

The cross sections of these reactions have been measured over the range 15 kev. to 500 kev. bombarding energy by a number of laboratories. For a discussion of the results of such measurements, attention is invited to: Hanson, Taschek, and Williams, Rev. Mod. Physics 21, 635 (1949); Arnold, Phillips, Sawyer, Stovall, and Tuck, LA-1480 (1952); and Agnew, Leland, Argo, Crews, Hemmendinger, Scott, and Taschek, Phys. Rev. 84, 862 (1951). FIG. 2 of the attached drawings is a rough plot of the results of these measurements as a function of the energy E of the bombarding particle (either D or T). The high results for the T+D reaction reflect more favorable values of the parameter $N_n$; this is caused by a "resonance" in the neighborhood of 100 kv.

The utilization of any of the above three reactions in a practical neutron source has heretofore been possible only in an accelerating machine with a well collimated ion beam impinging on a target. Heavy ice (frozen $D_2O$), deutrated paraffin, or hydrogen-absorbent metal are the usual target materials, and either deutrons or tritons are used for the ion beam. All of these targets have a lower neutron yield than a pure gas target, since they all contain extraneous elements. However, since the ion beam must be maintained in vacuo, the only way to use a gas target is to employ either a window or differential pumping, either expedient being extremely awkward in practice. A thick window absorbs too much of the energy of each ion, drastically lowering the neutron yield, and a thin window or a differential pumping scheme does not allow the maintenance of sufficient gas pressure to result in a compact source.

Re-examination of FIG. 2 will indicate that reasonable neutron yields can be expected at energies as low as 100 kev. or less; i.e., within the range of voltages at which gaseous X-ray tubes operate. It is contemplated by the present invention to provide a gaseous discharge in deuterium or tritium gas or in a mixture of these gases, arranged so as to allow the production of high energy positive ions which can interact with other atoms of the same gas before coming to rest thereby producing neutrons by virtue of one or more of the reactions given in Equation 3 above.

Examining the above statement more quantitatively, assume that it is possible to set up and operate a gaseous discharge apparatus which will maintain $dI/dE$ ions per kilovolt at an energy of E kilovolts, based on each ion carrying a charge of one electronic unit. Assume further that the total number of ions is small compared to the number of neutral atoms under the conditions of the discharge. Let the nuclear reaction cross section be $\sigma(E)$ and assume that pure deuterium or tritium gas is used. (The result for a mixture can easily be obtained by suitable linear combinations of the three reactions in Equation 3.) At a given pressure P, there will be N atoms/cc.:

$$N = \left(\frac{1}{22,400}\right)\frac{P}{760}(2N_A) \qquad (4)$$

where P is in mm. of Hg and $N_A$ is Avogadro's number. (There are 22,400 cc./mol. $N_A = (6.02)10^{23}$ molecules/mol, and hydrogen is diatomic.) The number of nuclear reactions $dc/dt$ per second per kilovolt energy range of ions will be:

$$\frac{dc}{dt} = v(E)N(dI/dE)\sigma(E) \qquad (5)$$

where $v(E)$ is the ion velocity. In the neighborhood of 100 kv., $v(E)$ is given by the nonrelativistic equation:

$$v(E) = \sqrt{\frac{2E}{m}} \qquad (6)$$

The number of neutrons produced per second, $dn/dt$, will then be:

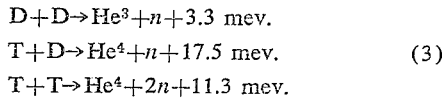

$$\frac{dn}{dt} = \int_0^{E_{max}} l\frac{dc}{dt}dE = lN\frac{2}{m}\int_0^{E_{max}} E^{1/2}\sigma(E)\frac{dI}{dE}dE \qquad (7)$$

where $l$ is the number of neutrons produced per reaction, and where integration is made over the ion energy spectrum in the discharge tube.

Equation 7 is the fundamental equation for the production of neutrons from a gaseous discharge. In order to give an appreciation of the order of magnitude of the effect, assume that in a tube of deuterim at $P=10$ microns pressure, a current of $J=10$ ma. of 50 kv. deuteron ions (atomic ions, not molecular ions) is maintained across a gap of $d=10$ cm. (This corresponds to about six mean free paths for molecular collisions.) Then the number of ions, I, present at any time is:

$$I = Jd/ve = \frac{Jd}{e}\sqrt{\frac{m}{2E}} \qquad (8)$$

where Equation 6 has been used for the ion velocity. Since in this hypothetical example the ions are monoenergetic, the integral (Eq. 7) can be dropped and there is obtained:

$$\left(\frac{dn}{dt}\right) = N\sigma(E)\frac{Jd}{e} \qquad (9)$$

Using $\sigma = 1.5$ mb, $l=1$ for the D—D reaction, and Equation 4 for N, one obtains:

$$\frac{dn}{dt} = \frac{10^{-4}}{2.24}\frac{10^{-4}}{7.6}(2)(6)10^{23}(1.5)10^{-27}\frac{(10^{-2})(10)}{(1.6)10^{-19}}$$

$$= 10^6 \text{ neutrons/sec.}$$

This result is the order of magnitude of the production of a 400 millicurie polonium-beryllium neutron source, as reported by Enrico Fermi in Nuclear Physics, University of Chicago Press (1950).

Since the cross section is such a strong function of voltage, for a given power input to the discharge tube (holding the product $JE_0$ constant), one expects to produce more neutrons in a high voltage, low current discharge than in an arc-type discharge where the current is high but the voltage drop is low.

In view of the foregoing theoretical considerations, a further object of the invention is to provide a discharge device capable of maintaining a high voltage glow discharge in a low pressure atmosphere of deuterium or tritium gas, or in a mixture of these two gases, which from FIG. 2, can be expected to give the greatest neutron yield.

The above-stated objects are accomplished and the desired results, eliminating the shortcomings of prior art devices, are obtained by a discharge device including at least two spaced electrodes enclosed in an envelope containing deuterium, tritium, or a mixture of deuterium and tritium at a predetermined pressure, and a source of energizing potential connected across said electrodes.

A better understanding of the invention will be had from the following detailed description taken in connection with the accompanying drawings in which:

FIG. 4 is a curve of breakdown potential as a function of the product of pressure and electrode spacing in a gaseous discharge device;

FIG. 5a is the current-voltage characteristic of a typical gaseous discharge device;

FIG. 5b is the probable current voltage characteristic of a discharge device operated in accordance with the present invention;

Figure 1:
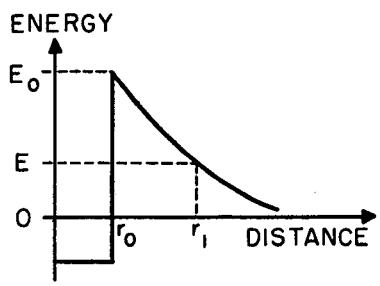
FIGS. 1 and 2 are curves referred to above in connection with the discussion of the theoretical basis of the present invention, and to which further reference will not be made.
Figure 2:
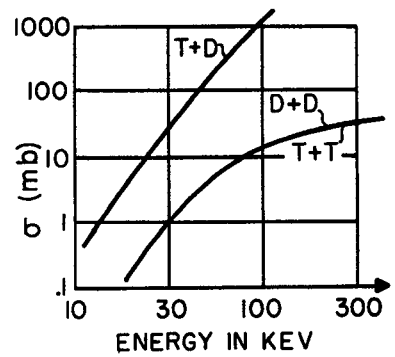
Figure 3:
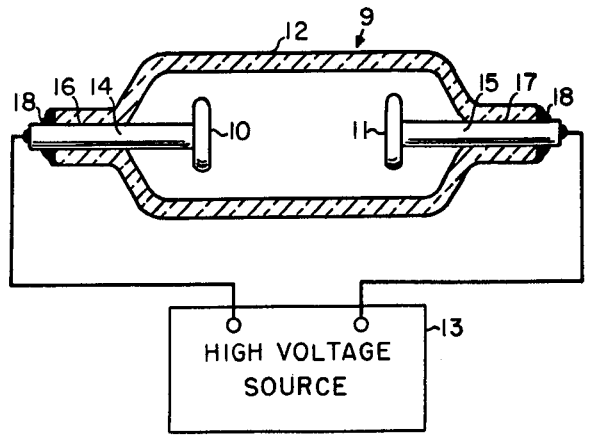
FIG. 3 is a schematic representation, partially in block diagram form, illustrating the general form of the invention.

Referring to FIG. 3, the invention in its simplified form, comprises a discharge device having two opposed electrodes 10 and 11 enclosed in a suitable envelope 12 containing a heavy isotope of hydrogen in the gaseous form (i.e., deuterium, tritium, or a mixture thereof), at a relatively low pressure. A source of high voltage 13, which may be an alternating current device, such as an X-ray transformer, but preferably a source of high potential direct current voltage, is connected across electrodes 10 and 11. Electrodes 10 and 11 may be circular discs approximately one inch in diameter and three-eighths of an inch thick, with all corners rounded to prevent corona and vacuum sparking under high voltage. Electrodes 10 and 11 are formed of tantalum, or other refractory conducting material capable of withstanding the high temperatures encountered in the discharge, and are mounted on nickel or other suitable conducting supporting rods 14 and 15, respectively, which are secured in position by kovar seals at 16 and 17. A vacuum-tight seal is provided by silver soldering at point 18.

It will be understood that the foregoing choice of materials is ilustrative only, and that other conducting materials capable of withstanding high temperature may be used. It is intended also that liquid cooled electrodes be within the scope of the invention, further widening the choice of suitable electrode materials. Similarly, any suitable vacuum-tight seal may be used instead of the kovar seal-silver solder combination.

For an understanding of the manner in which the apparently conventional discharge device of FIG. 3 functions to produce a useful flux of neutrons, a brief review of the theory of conduction in gases will be helpful in explaining the conditions necessary for the operation of the present invention. During the following discussion, reference will be made from time to time to FIGS. 4 and 5a which are respectively curves of breakdown potential as a function of the product of pressure and electrode spacing (as published on page 428 of "Theory and Application of Electron Tubes" by Reich, McGraw-Hill Book Company, 1944, for example), and the voltage-current characteristic of a gaseous discharge (as published on page 289 of "Electronics" by Millman and Seeley, McGraw-Hill Book Company, 1941, for example). FIG. 5b is the probable "voltage-current characteristic" of a gaseous discharge operated in accordance with the present invention, as will become apparent as the discussion proceeds.

Upon applying an external voltage through a series resistance across two electrodes of spacing $d$ in a gas at pressure $p$, virtually no current is drawn until a critical value of applied voltage, known as the "breakdown" voltage (point $a$ on the curve of FIG. 5a) is reached. At this point, the current becomes self-maintaining, and if the product $p \times d$ exceeds a certain minimum, point $m$ on the curve of FIG. 4, the current will, after a transition region, build up to such a level as to cause the voltage across the tube to drop to a considerably reduced value, and to maintain operation in the "normal glow discharge" region. The latter value of voltage, it turns out, is approximately equal to that breakdown voltage which is represented by point $m$ on the curve of FIG. 4. Moreover, this voltage is manifested almost entirely across a part of the discharge known as the "cathode dark space," which contains positive ions almost exclusively, and the dimension of this region, $d_k$, is just such as to make the product $p \times d_k$ equal to the minimum value of $pd$ referred to above and designated by point $m$. Thus, as the pressure $p$ is decreased, the dimension, $d_k$, of the cathode dark space increases, and when it becomes just equal to the spacing $d$ between the electrodes themselves, it is obvious that some sort of discontinuity in the mechanism of the discharge must occur. In particular, it is to be noted that as the pressure is further reduced, it takes considerably more voltage to maintain the discharge, since otherwise the positive ions would not bombard the cathode with sufficient energy to release the number of electrons required for the self-maintenance of current. Hence, as the pressure is further reduced, the current through the tube decreases, thereby decreasing the voltage drop across the external resistor and permitting the voltage across the tube electrodes to rise, until eventually the tube voltage is approximately equal to the applied voltage, whereupon a further reduction in the pressure would extinguish the discharge completely (since the applied voltage would become less than the breakdown voltage, which as shown in FIG. 4, is increasing with decreasing value of $p \times d$). Thus, practically any value of voltage may be maintained across the tube for reasonable values of current simply by reducing the pressure sufficiently and operating to the left of the minimum, $m$, of the curve of FIG. 4, and as has been seen from the above discussion, this voltage will also be the voltage drop which is experienced by the positive ions in their traversal across the gap between the electrodes. Thus, assuming the gas to be a heavy isotope of hydrogen, or a mixture of deuterium and tritium, the ions are permitted to acquire the high collision energies required for the efficient production of neutrons by the reactions of Equation 3 above. By adjusting the pressure $p$ so as to attain an optimum balance between the voltage per ion collision and the number of collisions across the gap, the maximum efficiency of neutron production may be attained. Moreover, the value of this optimum may, in general, be further increased by simultaneously reducing the value of the external resistance and the applied voltage, thus permitting a smaller differential between the applied voltage and actual tube voltage for the same discharge current. The pressure $p$ may then be readjusted and the parameters for a higher optimum value determined. The total neutron output may be subsequently adjusted by varying the area of the electrodes.

It is to be noted that the type of discharge described above is somewhat different from the more conventional type of "glow discharge" ordinarily encountered. The conventional curve of FIG. 5a obtains for conditions of pressure and electrode spacing which results in a product of $p \times d$ to the right of the minimum, $m$, of the curve of FIG. 4, whereas in the present invention, operation is in the region to the left of point $m$, and the voltage-current characteristic probably follows the curve of FIG. 5b which does not include a region comparable to the "normal glow discharge" region of the conventional curve. However, while operation to the left of point $m$ is preferred, it is not to be inferred that other types of discharges are necessarily excluded from the scope of the invention. For example, the "abnormal glow" region of the curve of FIG. 5a might find suitable application across the tube of the total voltage available. Alternatively, the region wherein the current is sustained by external agents might be utilized to advantage, an arrangement contemplating this type of operation being described in some detail hereinbelow in connection with FIG. 9. Whatever the region of operation, the gas discharge itself serves simultaneously as a medium of ion production, of acceleration and of target bombardment.

Returning now to the description of FIG. 3, the deuterium, tritium, or deuterium-tritium mixture, is maintained at a sufficiently low pressure within the envelope that the product of $p$ and the spacing, $d$, between electrodes 10 and 11 is at a desired point on the curve of FIG. 4 to the left of point $m$. While it has been assumed in the foregoing discussion that a direct current potential is applied across the tube electrodes, high voltage source 13 may have either a direct or an alternating current output; for alternating current, the discharge is maintained for a short period of each half cycle, and for direct current, the discharge is continuous, with a consequent continuous production of neutrons. Summarizing the foregoing description in a general way, when optimum conditions of pressure, electrode spacing and voltage are present, ions formed in the discharge region are accelerated toward the cathode and suffer collisions with neutral gas atoms present in the space between electrodes 10 and 11 with sufficient energy to produce neutrons by the

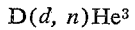

$$D(d, n)\mathrm{He}^3$$

and $T(d, n)\mathrm{He}^4$ reactions of Equation 3. With a 200 kv. voltage supply and a 50–50 mixture of deuterium and tritium, and an optimum balance between the voltage per ion collision and the number of collisions across the gap, a total neutron flux of at least $10^9$ neutrons/second may be expected for a tube current of 250 ma.

While the invention has been described in connection with FIG. 3 as being operated at a static gas pressure, it may be preferable to provide adjustment of the pressure within the envelope to permit optimization of neutron production in the presence of changes in other parameters. Likewise, it is desirable to provide controls for the adjustment of the voltage drop across the discharge and the magnitude of the discharge current to insure operation at a selected point on the voltage-current characteristic curve of the discharge. An apparatus for providing a continuous flow of gas through the discharge device, and an electrical circuit for adjusting the electrical characteristics of the discharge, is schematically represented in FIG. 6.

The illustrated voltage source 13 provides an alternating current output and is energized from a 220 volt, 60 cycle source 20, capable of delivering the maximum rated current of the primary 21 of high voltage transformer 22. Power is applied through switch 23, and two serially connected "Variacs" 24 and 25 permit adjustment of the voltage applied to primary 21. An adjustable limiting resistance 26 is connected in series with the "Variacs" to provide adjustment of the current and voltage in the discharge device 9 at their optimum value in accordance with the procedure outlined above. The primary current is indicated on ammeter 27, and the voltage across the primary is indicated by voltmeter 28. A milliammeter 29, conected between the secondary coils 30 and 31 of transformer 22, measures the secondary, and accordingly, the discharge current.

Figure 6:
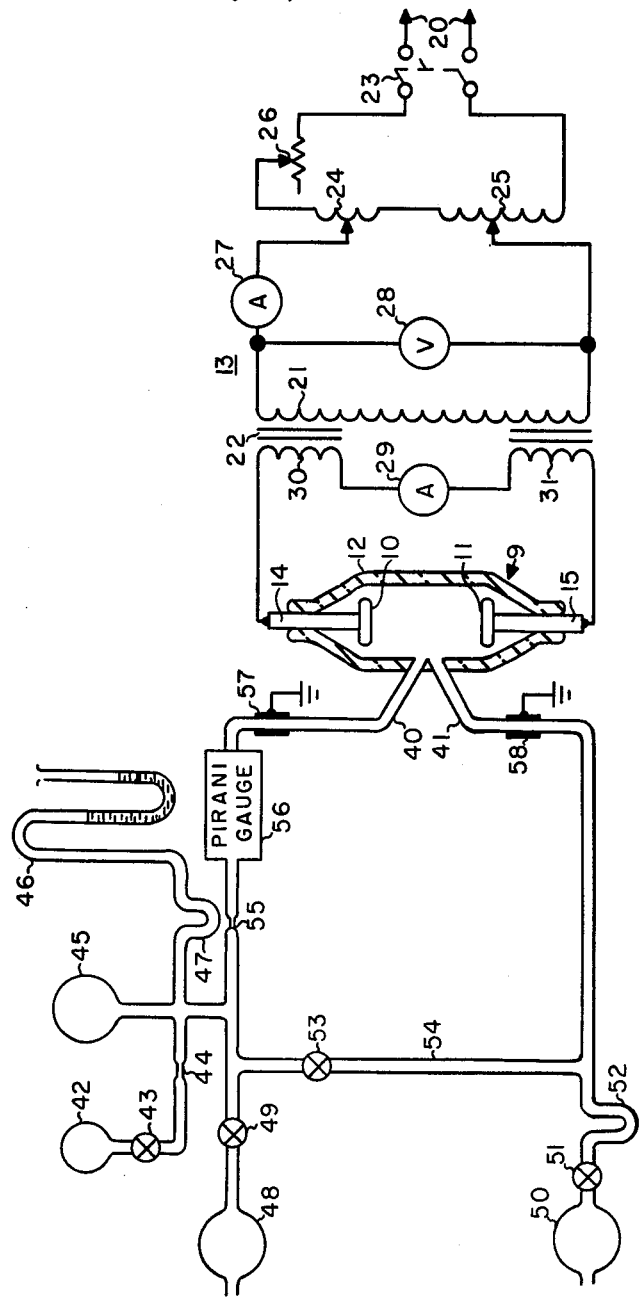
FIG. 6 is a schematic diagram of an illustrative embodiment of an electrical circuit and a vacuum system useful for the operation of the invention.

A vacuum system is diagrammatically illustrated in the left hand portion of FIG. 6 by which deuterium, tritium, or a mixture of deuterium and tritium is continuously passed through discharge tube 9 via an inflow tube 40 and an exhaust tube 41, while maintaining the proper dynamic pressure within the envelope for neutron production. In the following description of the operation of the system, the gas will be considered as deuterium only to avoid repetition, it being understood that the gas may also be tritium or a mixture of deuterium and tritium. A reservoir 42 for deuterium is connected via valve 43 through constriction 44 to a leak tank 45. The pressure in the leak tank is read on manometer 46 connected to the system through liquid air trap 47, the latter being provided to condense vapors in the system and to prevent mercury vapor from manometer 46 reaching the system. A roughing pump 48 is connected to the system via valve 49, and a fore-pump-diffusion pump combination 50 is connected to the system via valve 51 and liquid air trap 52. A valve 53 is provided in cross connection 54 between valves 51 and 49. Gas from leak tank 45 leaks through constriction 55 to the inlet tube 40 of discharge device 9, the pressure being indicated by Pirani gauge 56. Grounded double ended Kovar seals 57 and 58 on inlet tube 40 and exhaust tube 41, respectively, prevent the discharge in tube 9 from spreading to the vacuum system.

Preparatory to operation of the neutron source 9, reservoir 42 is removed and filled with deuterium (or tritium, or a mixture of deuterium and tritium) to a pressure of approximately one atmosphere, and thereafter connected to the system. With valves 49 and 53 open and all other valves closed, the system is partially evacuated with roughing pump 48. Then, with valves 51 and 53 open and all other valves closed, the system is evacuated to a pressure of less than a micron by diffusion pump 50. During pumping, the system and tube 9 may be flamed or otherwise heated to promote outgassing of the metal. All valves are then closed, and valve 43 opened until a pressure of approximately 15 cm. appears in leak tank 45 as indicated by manometer 46, and valve 43 again closed. When Pirani gauge 56 indicates a pressure of several millimeters of deuterium, tube 9 may be again flamed to promote ingassing. Valves 51 and 53 are then so adjusted that Pirani gauge 56 indicates a dynamic equilibrium pressure of about five microns for a separation between electrodes 10 and 11 of about 10 cm. In general, the starting pressure for a given electrode separation may be approximately computed by the formula, $p=50/d$, where $p$ is the pressure in microns and $d$ is the separation between the electrodes in cm.

With the gas flow characteristics established in the foregoing manner, switch 23 is closed with "Variacs" 24 and 25 in position of minimum voltage. The voltage is then increased until a glow discharge appears between electrodes 10 and 11 of tube 9. To overcome the initial tendency of the glow discharge to extinguish itself due to rapid ingassing of the walls and electrodes of tube 9, the pumping speed may be decreased by slightly closing valves 51 and 53 until equilibrium is reached. When equilibrium is reached, the voltage across the tube and the discharge current may be increased by means of Variacs 24 and 25 and resistor 26 until conditions for optimum production of neutrons is reached. Apparatus constructed according to FIGS. 3 and 6, was satisfactorily operated with an alternating current voltage of approximately 120 kv. peak value impressed across the electrodes and a discharge current of about 10 ma. Deuterium gas only was circulated through the tube at an equilibrium dynamic pressure of about 6 microns and the spacing between electrodes was approximately 8.3 cm. Under these conditions, a total neutron production rate of approximately $10^6$ neutrons/second was observed, with operation probably occurring in the vicinity of point $b$ of the curve of FIG. 5b.

While specific electrical and vacuum systems have been described for obtaining and maintaining the proper pressure and electrical conditions in tube 9, it will be understood that it is illustrative only, and that many changes can be made therein without departure from the scope of the invention. For example, in the electrical system, it may be desirable to rectify the output of transformer 22 to obtain greatest neutron production efficiency of the tube, and of course, "Variacs" 24 and 25 may be replaced by any other suitable voltage regulator. Likewise, many variations are possible in the vacuum system of FIG. 6. For instance, the system may be made cyclic to recirculate the deuterium gas instead of exhausting it as is the case in the described embodiment. Also, any suitable gauges may be substituted for the Pirani gauge and the manometer for indicating pressure conditions in the system. Furthermore, with a properly conditioned tube, it is possible to eliminate the constant flow of gas and still maintain the proper pressure in the tube. In general, any arrangement by which the correct pressure of gas, is maintained within tube 9 is intended to be within the scope of the invention.

The mechanics of the discharge gap for the production of neutrons has been described in connection with FIG. 3 and inasmuch as the operation is the same whether the gas is at a static predetermined pressure or is maintained at the proper equilibrium dynamic pressure, it will be unnecessary to repeat the description here.

Figure 7:
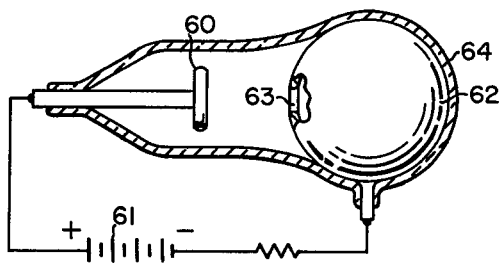

While the discharge tube 9 has been described in FIGS. 3 and 6 as having plane circular electrodes, other forms of electrodes may be preferable in the practice of the invention. In FIG. 7, for example, the positive electrode 60 (assuming for purposes of the present discussion a direct current voltage source 61) is a circular disc and the negative electrode 62 comprises a hollow cylindrical conducting sphere having a relatively small circular aperture 63 therein, disposed opposite disc 60. Both electrodes are disposed within a suitable envelope 64 in which is maintained deuterium gas, tritium gas, or a mixture of deuterium and tritium at a suitable low pressure. All of the edges of opening 63 are carefully rounded to prevent corona and sparking from the region to promote the maintenance of a uniform glow discharge between electrode 60 and the surface of sphere 62 in the region of aperture 63. When a gas discharge of the type described earlier takes place between electrode 60 and the portion of sphere 62 opposed thereto, positive ions produced in the discharge are accelerated toward aperture 63 and suffer collision with gas molecules present in the space between the electrodes. A large percentage of the accelerated ions, by virtue of their high velocity, are not attracted to sphere 62, but continue in a substantially straight path into the interior of sphere 62. The interior of sphere 62 defines a field-free space containing deuterium, tritium, or the deuterium-tritium mixture. Ions entering the sphere suffer further collisions with gas molecules before coming to rest on the inner surface of the sphere. The diameter of the sphere is large compared to the spacing between electrode 60 and opening 63, preferably corresponding to 10 to 20 mean free paths for ions at the maintained pressure, to permit several collisions of the accelerated ions with gas molecules in the space between opening 63 and the back wall of the sphere. Whereas the plane electrode arrangement of FIGS. 3 and 6 may be expected to cause one or two potentially neutron-producing collisions of each ion with a deuterium or tritium atom, the field-free space should result in multiple potentially neutron-producing collisions thereby measurable increasing the neutron output of the device.

Figure 8:
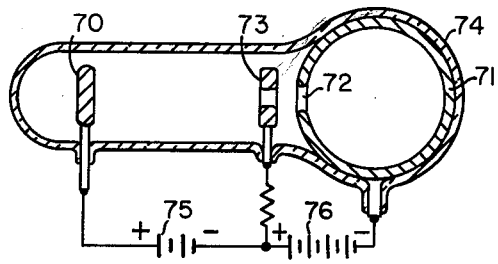

FIG. 8 illustrates another modification which includes the field-free space feature just discussed and three electrodes instead of two. The tube comprises an anode 70, which may be a flat circular disc, a hollow sphere 71 having a circular opening 72, and an accelerating electrode 73 in the form of an annular ring, disposed intermediate the anode and opening 72. The electrodes are enclosed in a suitable envelope 74 filled with deuterium, tritium, or a mixture of deuterium and tritium. The tube is energized by two direct potential sources, source 75 being connected between electrodes 70 and 73 for maintaining therebetween a glow discharge, preferably a high voltage discharge of the type described above in connection with FIG. 3. As in the two-electrode devices previously described, a certain number of potentially neutron-producing collisions occur in the discharge region, but there are excess positive ions available in the discharge which do not produce neutrons. The excess ions, which have considerable velocity by virtue of their acceleration in the discharge region, pass through the central aperture in electrode 73 and are further accelerated through the region between electrode 73 and aperture 72 by voltage source 76 connected as shown, and enter the field-free space within sphere 71. The spacing between electrode 63 and opening 62 is preferably of the order of one mean free path for ions at the operating pressure so that collisions of the ions with gas molecules in that region are unlikely, thus assuring the entry into the sphere of substantially all of the accelerated positive ions passing through electrode 73. The spacing between electrodes 70 and 73 is preferably of the order of ten mean free paths, and sphere 71 preferably has a diameter corresponding to ten to twenty mean free paths to permit multiple collisions of the accelerated positive ions with gas molecules before coming to rest on the wall of the sphere.

Figure 9:
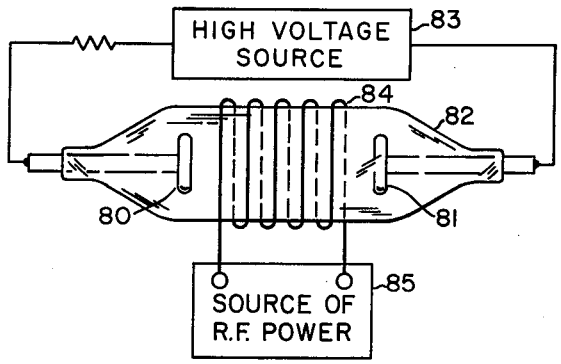

FIG. 9 illustrates an arrangement for operating discharge devices of the type herein disclosed in the region where the current is sustained by external agents. (See FIG. 5a.) For purposes of illustration, the discharge device comprises a pair of disc-type electrodes 80 and 81 disposed within envelope 82 containing a heavy isotope of hydrogen. High voltage source 83, which is preferably adjustable in output, is connected across the electrodes. A voltage somewhat lower than the breakdown potential is applied, and the current sustained by radio-frequency power coupled to the gas within the tube by coil 84 wrapped about the tube and energized from source 85. The radio-frequency power excites the gas molecules within the envelope to such a level that ions are created therein, and due to the phenomena of "gas multiplication," the current is maintained in the tube. If the device is operated under conditions of pressure and electrode spacing such that the product $p \times d$ is to the left of point $m$ (FIG. 4), the magnitude of the voltage, while still below the breakdown voltage, is sufficient to effect potentially neutron-producing collisions of ions and gas molecules in the region between the electrodes.

It will be understood that improved operation of the devices of FIGS. 3, 6, 7, 8 and 9 might be attained by surrounding the envelope with a coil adapted to produce a magnetic field axially of the tube. The magnetic field would have the effect of focusing the ions formed in the discharge into a beam, thus insuring, particularly in the devices of FIGS. 7 and 8, the passage of a large percentage of the produced ions through apertures 63, 73 and 72, and would also improve the efficiency of the devices by reducing the loss of ions and electrons to the envelope.

From the foregoing description it is seen that the above stated objects are realized by the present invention in that there is provided an apparatus for producing neutrons which is of simple design, easy to operate, and capable of design into a portable instrument. Neutrons are produced by the collision of deuterons or tritons or a gaseous target of a heavy isotope of hydrogen or a mixture thereof entirely through the mechanism of a high voltage electrical discharge; i.e., positive ions are formed, accelerated and collide with atoms of the hydrogen isotope within the discharge region thereby producing a neutron flux of useful magnitude. The fast neutron output of the device may be used directly for certain applications, and while not specifically illustrated or described, it will be understood that the device may be surrounded with suitable thermalizers, such as water, paraffin, etc., to provide a thermal neutron flux.

Although specific embodiments of the invention have been shown and described, applicants are aware that other modifications and numerous applications thereof are possible. It is the intention, therefore, that the invention be limited only as indicated by the scope of the following claims.

What is claimed is:

1. In apparatus for producing neutrons, a discharge device comprising an envelope containing a heavy isotope of hydrogen in the gaseous form, first and second spaced electrodes disposed within said envelope, said second electrode having an aperture therein whereby accelerated positive ions of said heavy isotope of hydrogen are adapted to pass therethrough when a high voltage discharge is maintained between said electrodes upon application thereto of a suitable voltage, and means defining a field-free space behind said second electrode into which said positive ions are accelerated and in which said positive ions are adapted to suffer collisions with neutral gaseous atoms of said hydrogen isotopes present in said field-free space with the resultant production of neutrons.

2. Apparatus for producing neutrons comprising, an envelope containing a heavy isotope of hydrogen in the gaseous form, first and second spaced electrodes disposed within said envelope, said first electrode being in the form of a disc and said second electrode comprising a conducting sphere having an aperture therein opposite said disc, a source of high voltage connected across said electrodes for maintaining a high voltage discharge in the region between said electrodes, positive ions of said heavy isotope of hydrogen formed in said discharge being accelerated through said aperture into the field-free space within said sphere with sufficient energy to produce neutrons upon collision with neutral atoms of said hydrogen isotopes present therein.

3. Apparatus for producing neutrons comprising, an envelope containing a heavy isotope of hydrogen in the gaseous form at a predetermined pressure, first and second spaced electrodes disposed within said envelope, said first electrode being in the form of a disc and said second electrode comprising a conducting sphere having an aperture opposite said disc, a source of high voltage connected across said electrodes for maintaining a gaseous discharge in the region between said electrodes, positive ions of said heavy isotope of hydrogen formed in said discharge being accelerated through said aperture into the field-free space within said sphere with sufficient energy to produce neutrons upon collision with neutral atoms of said hydrogen isotope present therein, the diameter of said sphere corresponding to a plurality of mean free paths for ions at said predetermined pressure.

4. Apparatus for producing neutrons comprising, an envelope containing a heavy isotope of hydrogen in the gaseous form at a predetermined pressure, first and second opposed electrodes disposed within said envelope, a first source of voltage connected across said first and second electrodes for maintaining a high voltage gaseous discharge in the region between said first and second electrodes, said second electrode having an aperture therein whereby positive ions of said heavy isotope of hydrogen formed in the cathode dark space of said discharge are accelerated through said aperture, a third electrode disposed within said envelope, and spaced from said second electrode, and a second source of voltage connected across said second and third electrodes for further accelerating the positive ions passing through said aperture, said accelerated positive ions upon collision with neutral atoms of said hydrogen isotopes resulting in the production of neutrons.

5. Apparatus in accordance with claim 4 wherein said third electrode comprises a conducting sphere having an aperture therein arranged opposite said second electrode, said sphere defining a field-free space for providing multiple collisions of accelerated ions with neutral atoms of said hydrogen isotopes.

6. Apparatus in accordance with claim 4 wherein said thrid electrode comprises a conducting sphere having an aperture disposed opposite the aperture in said second electrode, the spacing between said first and second electrodes corresponding to approximately ten mean free paths for ions at said pressure, the spacing between said second and third electrodes corresponding to approximately one mean free path for ions at said pressure, and the diameter of said sphere corresponding to ten to twenty means free paths for ions at said pressure.

7. Apparatus for producing neutrons comprising, a discharge device including at least two electrodes spaced apart a fixed distance within an envelope and characterized by a minimum breakdown potential when the product of the pressure within said envelope and said electrode spacing is a predetermined value and a breakdown potential larger than said minimum when said product is larger or smaller than said predetermined value, means for maintaining a gas including a heavy isotope of hydrogen at a pressure within said envelope such that the product of pressure and said electrode spacing is substantially less than said predetermined value, means for impressing a voltage across said electrodes slightly lower than the breakdown potential corresponding to the product of said maintained pressure and said electrode spacing, and a source of radio-frequency power coupled to said envelope for ionizing said gas to maintain a current between said electrodes at said voltage whereby ions produced in the region between said electrodes are accelerated with sufficient energy that upon collision with netural atoms of said hydrogen isotope neutrons are produced.

References Cited in the file of this patent

UNITED STATES PATENTS

| | | |
|---|---|---|
| 2,689,918 | Youmans | Sept. 21, 1954 |
| 2,712,081 | Fearon et al. | June 28, 1955 |